United States Patent [19]
Wachi et al.

[11] Patent Number: 5,311,170
[45] Date of Patent: May 10, 1994

[54] METHOD AND SYSTEM FOR MAKING BIPOLAR SWITCHING TO PROTECTION CHANNEL

[75] Inventors: Hiroyuki Wachi; Yoshihiro Ito, both of Kawasaki, Japan

[73] Assignee: Fujitsu Limited, Japan

[21] Appl. No.: 808,017

[22] Filed: Dec. 13, 1991

[30] Foreign Application Priority Data

Dec. 20, 1990 [JP] Japan .................... 2-411928

[51] Int. Cl.⁵ .............................. H04L 1/00
[52] U.S. Cl. .................. 340/825.01; 340/825.03; 340/827; 455/8
[58] Field of Search ............. 340/825.01, 825.03, 340/825.05, 826, 827; 370/13; 375/11; 455/8, 9, 10

[56] References Cited

U.S. PATENT DOCUMENTS

| | | | |
|---|---|---|---|
| 3,878,463 | 4/1975 | Lanigan | 340/825.03 |
| 4,395,772 | 7/1983 | Trested, Jr. | 340/825.03 |
| 4,837,780 | 6/1989 | Grover | 375/111 |

FOREIGN PATENT DOCUMENTS

| | | |
|---|---|---|
| 0214497 | 3/1987 | European Pat. Off. |
| 0217490 | 4/1987 | European Pat. Off. |
| 0310110 | 4/1989 | European Pat. Off. |
| 60-194839 | 3/1985 | Japan |
| 60-237731 | 11/1985 | Japan |

*Primary Examiner*—Donald J. Yusko
*Assistant Examiner*—John E. Giust
*Attorney, Agent, or Firm*—Greer, Burns & Crain, Ltd.

[57] ABSTRACT

A method is used to switch a channel which is used for a communication between a transmitting end and a receiving end from a main channel to a protection channel. The method of the present invention allows automatic compensation for the loss caused by the switching of the channel to the protection channel. Furthermore, the level difference of the baseband signal outputs from each of the main channels can be automatically controlled to zero regardless of the main channel from which the channel is switched to the protection channel.

13 Claims, 8 Drawing Sheets

METHOD AND SYSTEM FOR MAKING BIPOLAR SWITCHING TO PROTECTION CHANNEL

BACKGROUND OF THE INVENTION

The present invention generally relates to methods and systems for switching the channel from a main channel to a protection channel, and more particularly to a method and a system for switching the channel from the main channel to the protection channel in a digital multiplexed radio equipment or the like.

Figure 1:
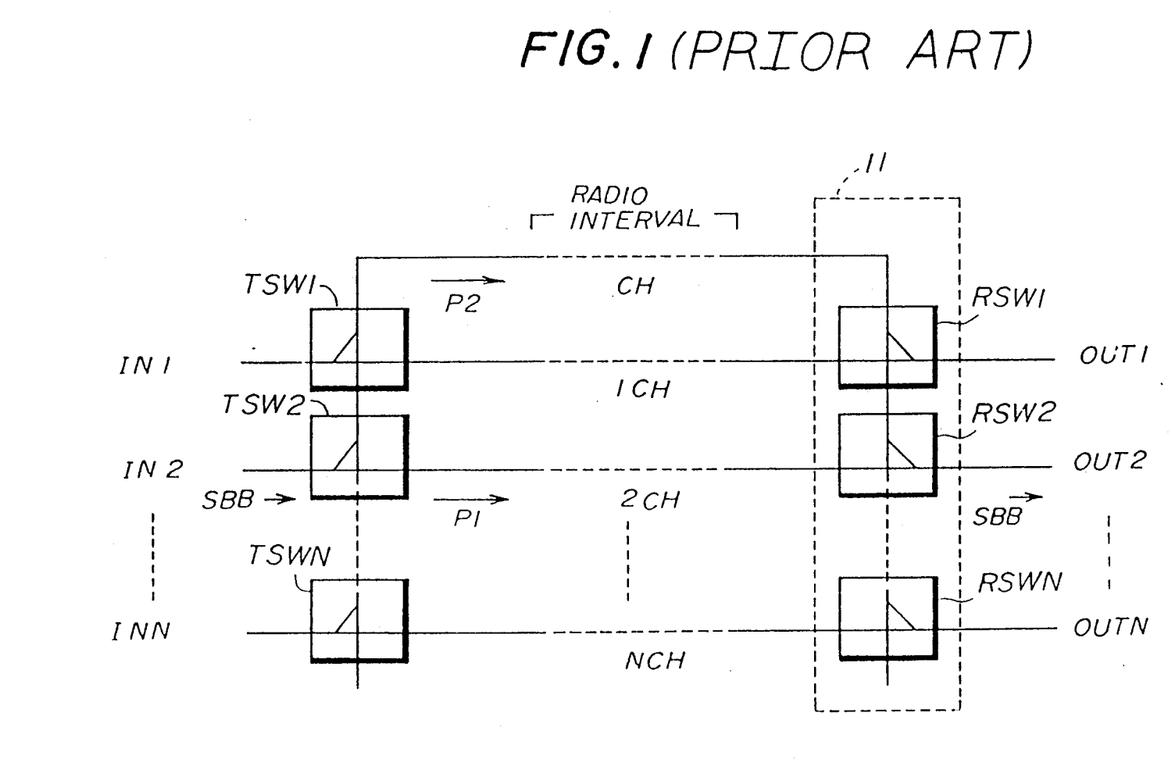
FIG. 1 is a system block diagram showing a baseband switching system for a basic radio line.

FIG. 1 shows a baseband switching system for a basic radio line, where one protection (or auxiliary) channel is provided with respect to N channels which receive baseband signal inputs IN1 through INN. A bipolar switching part 11 of a receiving part is surrounded by a dotted line.

With respect to main channels 1CH, 2CH, ..., NCH of the radio interval, bipolar switches TSW1, TSW2, ..., TSWN made up of relays are provided in a transmitting part for the purpose of switching to a protection channel CH. On the other hand, in the bipolar switching part 11 at the receiving part, bipolar switches RSW1, RSW2, ..., RSWN made up of relays are provided for the purpose of switching to the protection channel CH.

Figure 2A:
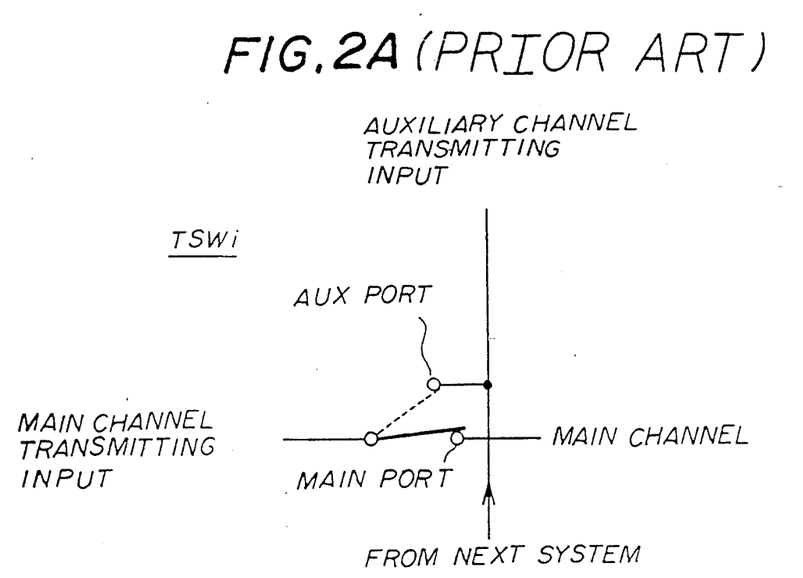
FIGS. 2A and 2B respectively are diagrams for explaining the operations of bipolar switches provided on transmitting and receiving ends.
Figure 2B:
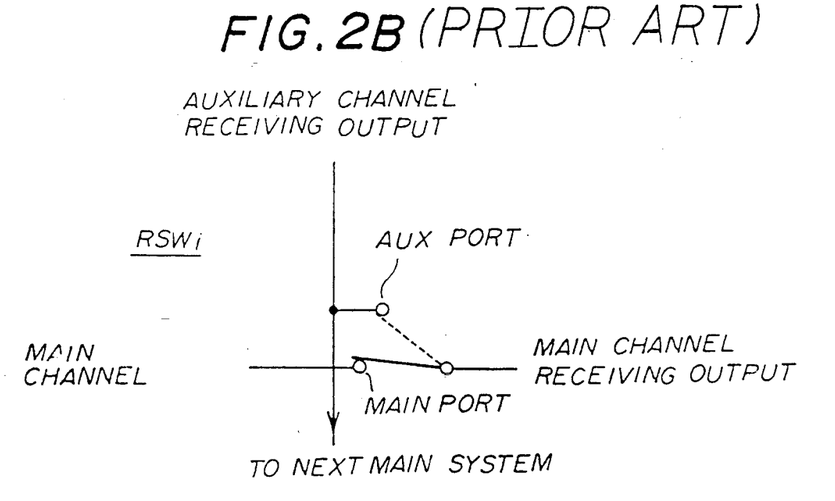

FIG. 2A shows the bipolar switch TSWi on the transmitting end, and FIG. 2B shows the bipolar switch RSWi on the receiving end, where i=1, 2, ..., N.

In FIG. 2A, the bipolar switch TSWi connects the transmitting input of the main channel to the main channel when connected to a main port. On the other hand, the bipolar switch TSWi connects the transmitting input of the main channel to the protection channel when connected to a protection (auxiliary) port.

In FIG. 2B, the bipolar switch RSWi connects the main channel to the receiving output of the main channel when connected to a main port. On the other hand, the bipolar switch RSWi connects the main channel to the receiving output of the protection channel when connected to a protection port.

The bipolar switches TSWi and RSWi shown in FIGS. 2A and 2B are respectively connected in series relative to the protection line on the respective transmitting and receiving ends.

In the baseband switching system shown in FIG. 1, the bipolar switches TSW1 through TSWN and the bipolar switches RSW1 through RSWN are normally all connected to the main channels 1CH through NCH, and in case of no baseband signal and unipolar switching failure are transmitted to the protection channel CH. Accordingly, a signal SBB input from the baseband signal input IN2, for example, is output to the baseband signal output OUT2 via a path P1 in the radio interval.

For the sake of convenience, it is assumed that a failure is generated in the radio interval in the main channel 2CH or the path P1, for example. The failure may be caused by an equipment failure, a deterioration of the line quality and the like. In this case, the bipolar switch TSW2 on the transmitting side and the bipolar switch RSW2 on the receiving side are respectively switched and connected to the protection channel CH. As a result, the base band signal input IN2 is transmitted via the protection channel CH or a path P2 of the radio interval.

According to the baseband switching system shown in FIG. 1, the loss of the signal SBB in the normal state is only the attenuation caused by the bipolar switch RSW2 on the receiving side. In this case, the loss caused by the bipolar switch TSW2 on the transmitting side is neglected because this loss is compensated for by the radio equipment. But when the protection channel CH is used, the signal SBB passes via the path P2 and the loss of the signal SBB in this case is caused by the series connected bipolar switches RSW1 and RSW2 on the receiving side.

Hence, in the baseband switching system for a digital multiplexed radio equipment using N+1 channels, the use of the main channel which includes the failure is avoided by switching the channel from the main channel to the protection channel. The switching of the channel is made via relay contacts, that is, bipolar switching. As a result, the baseband signal of the main channel which includes the failure is transmitted via the protection channel, but the baseband signal is affected by the loss caused by the passing of the baseband signal through the bipolar switches in addition to the change in the length of the transmission path.

As may be seen from FIG. 1, the number of bipolar switches through which the baseband signal passes increases as the distance between the protection channel and the main channel which includes the failure increases, and the loss consequently increases. In addition, the baseband signal outputs which are affected by the loss are subject to losses which are different for each channel. As a result, the levels of the baseband signal outputs which are affected by the loss greatly differ, and this tendency become more conspicuous as the the number of main channel increases.

Conventionally, the above described loss is extremely small when the number of channels is relatively small, and the performance of the system can be maintained according to the specifications. For this reason, no compensation circuit is conventionally provided within the system to compensate for the above described loss, and the baseband signal which is actually affected by the loss is output as it is.

However, the number of channels requested by the customer in digital multiplexed radio equipments is gradually increasing in recent years. Hence, when the number of channels increases to 11+1 which is the maximum number of channels in the case of the 4 and 11 GHz band, for example, there are problems in that the loss can no longer be neglected and the performance of the system may no longer be maintained according to the specifications.

SUMMARY OF THE INVENTION

Accordingly, it is a general object of the present invention to provide a novel and useful method and system for switching the channel from the main channel to the protection channel in a digital multiplexed radio equipment or the like.

Another and more specific object of the present invention is to provide a method of switching a channel which is used for a communication between a transmitting end and a receiving end from a main channel to a protection channel, the transmitting end including N first bipolar switches respectively having an input port for receiving a baseband signal input, a main port for outputting the baseband signal input to a corresponding one of N main channels and a protection port for outputting the baseband signal input to the protection channel, the protection ports of the N first bipolar switches being connected in series to the protection channel, the input port of the first bipolar switch being normally connected to the main port and connected to the protection port when switching to the protection channel, the receiving end including N second bipolar switches respectively having a main port for receiving the baseband signal input received from the transmitting end via a corresponding one of the N main channels, a protection port for receiving the baseband signal input received from the transmitting end via the protection channel and an output port for outputting the received baseband signal input as a baseband signal output, the protection ports of the N second bipolar switches being connected in series to the protection channel, thereby a loss of the received baseband signal input when the protection channel is used being dependent on an arbitrary number of second bipolar switches through which the received baseband signal input passes before the baseband signal output is obtained, the output port of the second bipolar switch being normally connected to the main port and connected to the protection port when switching to the protection channel, the method comprising the steps of (a) recognizing at the receiving end the main channel from which the channel is switched to the protection channel, (b) generating at the receiving end control information related to an amplification of the baseband signal input received via the protection channel based on the main channel recognized in the step (a), and (c) amplifying at the receiving end the baseband signal input received via the protection channel by the amplification determined by the control information generated by the step (b). According to the method of the present invention, it is possible to automatically compensate for the loss caused by the switching of the channel to the protection channel. Furthermore, the level difference of the baseband signal outputs from each of the main channels can be automatically controlled to zero regardless of the main channel from which the channel is switched to the protection channel.

Still another object of the present invention is to provide a system for switching a channel which is used for a communication between a transmitting end and a receiving end from a main channel to a protection channel, the transmitting end including N first bipolar switches respectively having an input port for receiving a baseband signal input, a main port for outputting the baseband signal input to a corresponding one of N main channels and a protection port for outputting the baseband signal input to the protection channel, the protection ports of the N first bipolar switches being connected in series to the protection channel, the input port of the first bipolar switch being normally connected to the main port and connected to the protection port when switching to the protection channel, the receiving end including N second bipolar switches respectively having a main port for receiving the baseband signal input received from the transmitting end via a corresponding one of the N main channels, a protection port for receiving the baseband signal input received from the transmitting end via the protection channel and an output port for outputting the received baseband signal input as a baseband signal output, the protection ports of the N second bipolar switches being connected in series to the protection channel, thereby a loss of the received baseband signal input when the protection channel is used being dependent on an arbitrary number of second bipolar switches through which the received baseband signal input passes before the baseband signal output is obtained, the output port of the second bipolar switch being normally connected to the main port and connected to the protection port when switching to the protection channel, the system comprising switched channel recognizing means for recognizing at the receiving end the main channel from which the channel is switched to the protection channel, amplification control means for generating at the receiving end control information related to an amplification of the baseband signal input received via the protection channel based on the main channel recognized in the switched channel recognizing means, and amplifying means for amplifying at the receiving end the baseband signal input received via the protection channel by the amplification determined by the control information generated by the amplification control means. According to the system of the present invention, it is possible to automatically compensate for the loss caused by the switching of the channel to the protection channel. Furthermore, the level difference of the baseband signal outputs from each of the main channels can be automatically controlled to zero regardless of the main channel from which the channel is switched to the protection channel.

Other objects and further features of the present invention will be apparent from the following detailed description when read in conjunction with the accompanying drawings.

DESCRIPTION OF THE PREFERRED EMBODIMENTS

Figure 3:
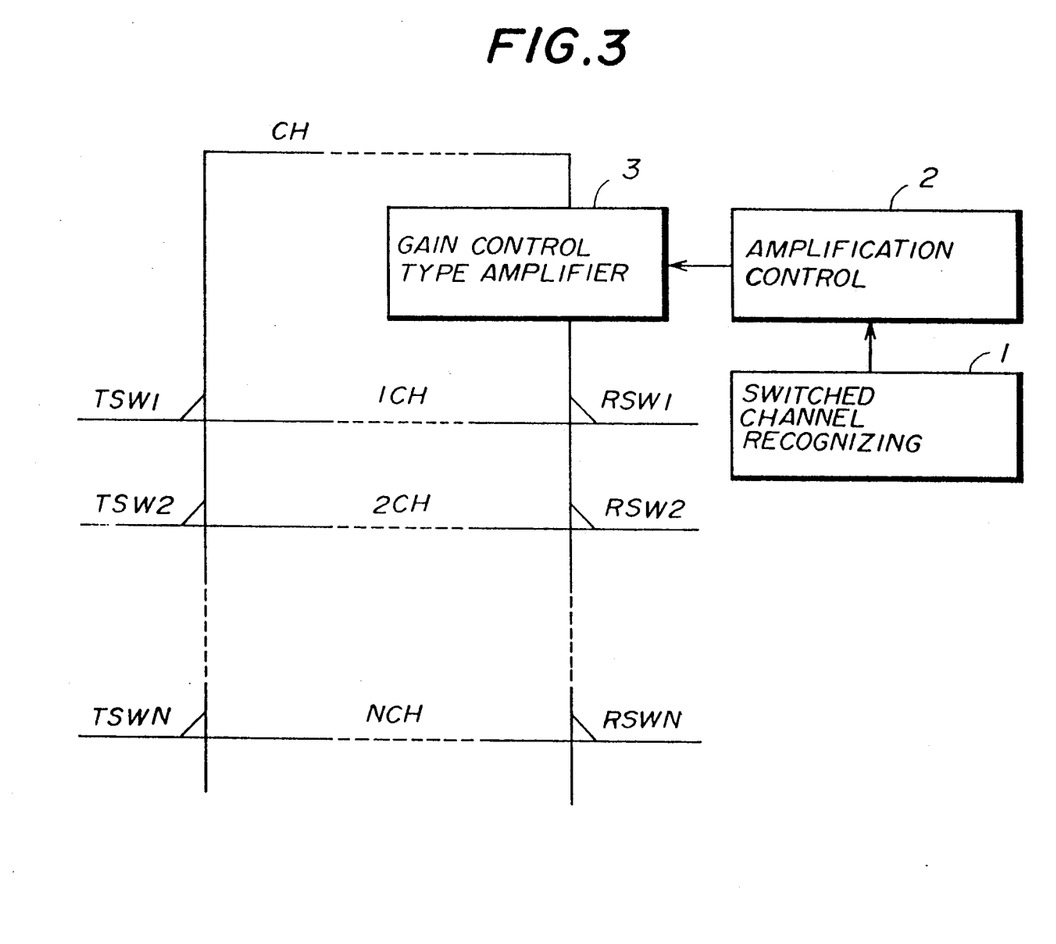
FIG. 3 is a system block diagram for explaining the operating principle of the present invention.

First, a description will be given of the operating principle of the present invention, by referring to FIG. 3. In FIG. 3, those parts which are basically the same as those corresponding parts in FIG. 1 are designated by the same reference numerals.

In FIG. 3, one auxiliary (or protection) channel CH is provided with respect to N main channels 1CH through NCH. Main ports of bipolar switches TSW1 through TSWN are respectively connected to the main channels 1CH through NCH on the transmitting end, while main ports of bipolar switches RSW1 through RSWN are respectively connected to the main channels 1CH through NCH on the receiving end. Auxiliary ports of the bipolar switches TSW1 through TSWN are connected in series and the protection port of the bipolar switch TSW1 is connected to the protection channel CH. Similarly, protection ports of the bipolar switches RSW1 through RSWN are connected in series, and the protection port of the bipolar switch RSW1 is coupled to the protection channel CH via a gain control type amplifier 3.

A switched channel recognizing part 1 recognizes the main channel iCH which is switched to the protection channel CH, where i is an arbitrary one of 1 to N. An amplification control part 2 is coupled to the switched channel recognizing part 1 and generates control information related to the amplification corresponding to the main channel iCH which is recognized in the switched channel recognizing part 1. The gain of the gain control type amplifier 3 is varied depending on the control information which is output from the amplification control part 2.

Accordingly, the loss which is generated as the signal passes through the bipolar switches when switching the channel from the main channel to the protection channel is automatically compensated by the gain control type amplifier 3 because the control information instructs the gain control type amplifier 3 to carry out a signal amplification necessary to compensate for the loss caused by one or a plurality of bipolar switches through which the signal passes when using the protection channel CH. As a result, it is possible to output the signal without signal attenuation even when the channel is switched from the main channel to the protection channel and the signal is passed through the protection channel.

Figure 4:
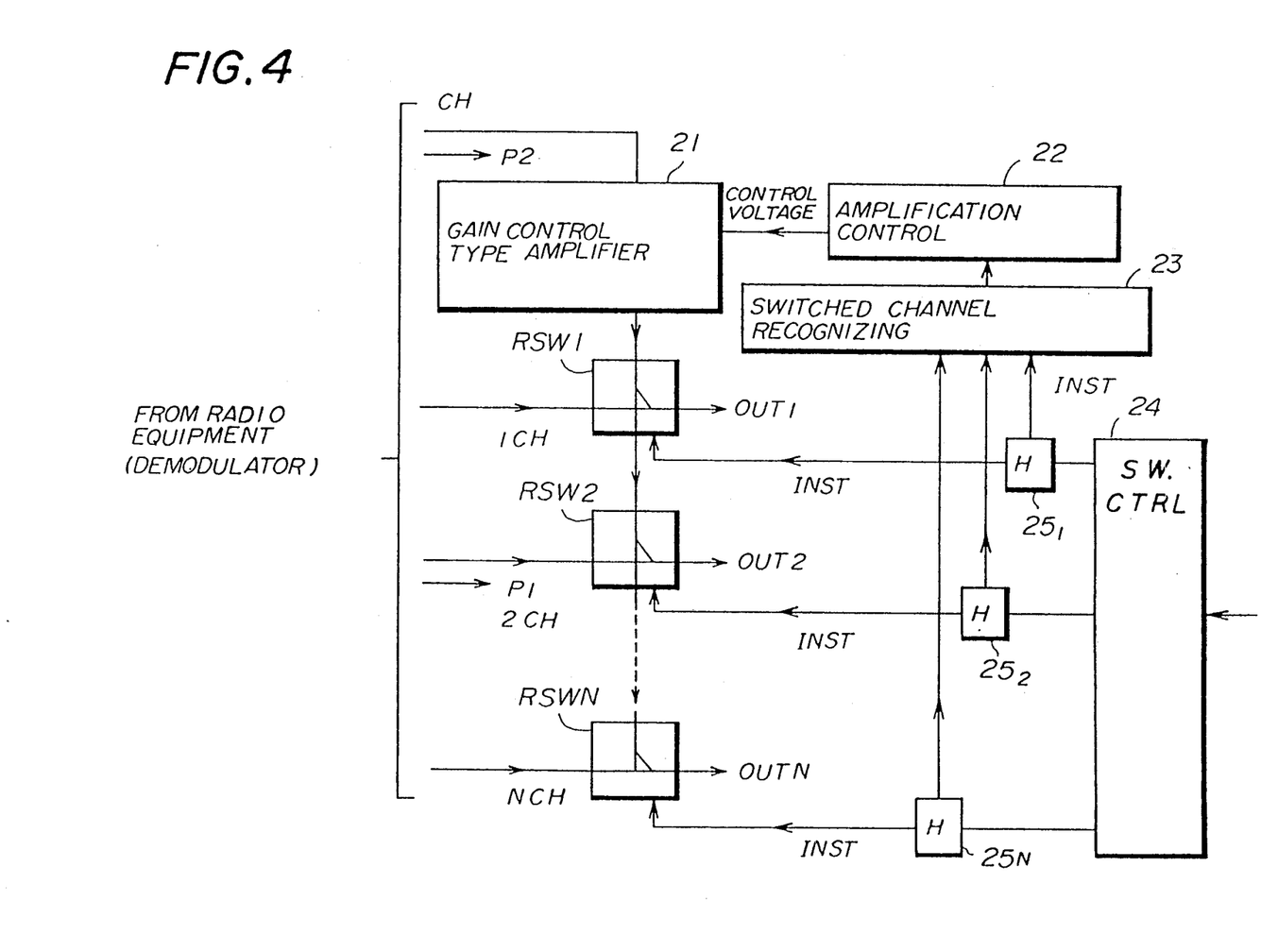
FIG. 4 is a system block diagram showing an essential part of a first embodiment of a protection channel switching system according to the present invention.

Next, a description will be given of a first embodiment of a protection channel switching system according to the present invention, by referring to FIG. 4. This embodiment of the system employs an embodiment of a protection channel switching method according to the present invention. In FIG. 4, those parts which are basically the same as those corresponding parts in FIG. 1 are designated by the same reference numerals, and a description thereof will be omitted.

FIG. 4 shows a bipolar switching part of a receiving part of a (N+1)-channel baseband switching system of a digital multiplexed radio equipment. The bipolar switching part includes a gain control type amplifier circuit 21, an amplification control circuit 22, a switched channel recognizing circuit 23, a switching control circuit 24, and hybrid circuits $25_1$ through $25_N$ which are provided in correspondence with switching instructions INST of the main channels 1CH through NCH from the switching control circuit 24.

In a case where the main channel 2CH is in a normal state, the baseband signal input IN2 passes through the path P1 and is output as the baseband signal output OUT2 via the bipolar switch RSW2. If the line quality of the main channel 2CH deteriorates, a switching instruction INST is output from the switching control circuit 24 and is supplied to the bipolar switch TSW2 on the transmitting end and to the bipolar switch RSW2 on the receiving end. Accordingly, the baseband signal input IN2 is output as the baseband signal output OUT2 via the path P2 or the protection channel CH. As a result, the level of the baseband signal output OUT2 is reduced by loss A caused by the bipolar switch RSW1 on the receiving end and is therefore a lower level than the baseband signal output OUT2 which would be output via the normal main channel 2CH.

The switched channel recognizing circuit 23 recognizes from which main channel the channel is switched to the protection channel CH, based on the switching instructions INST which are received via the hybrid circuits $25_1$ through $25_N$. In this case, the switched channel recognizing circuit 23 recognizes from the switching instruction INST received via the hybrid circuit $25_2$ that the switching took place from the main channel 2CH to the protection channel CH, and instructs the amplification control circuit 22 accordingly. Based on the instruction from the switched channel recognizing circuit 23, the amplification control circuit 22 controls the gain of the gain control type amplifier circuit 21 so as to compensate for the loss A caused by the bipolar switch RSW1 on the receiving end. As a result, the gain of the gain control type amplifier circuit 21 is raised by an appropriate quantity sufficient to compensate for the loss A caused by the bipolar switch RSW1 on the receiving end.

Accordingly, there is no level difference between the baseband signal output OUT2 which is output when the baseband signal input IN2 passes through the normal main channel 2CH and the baseband signal output OUT2 which is output when the baseband signal input IN2 passes through the protection channel CH. The loss caused by one or more bipolar switches on the receiving end is similarly compensated for baseband signal inputs passing through the protection channel CH instead of the other main channels, and the level difference between the baseband signal output obtained via the main channel and the baseband signal output obtained via the protection channel CH is constantly and automatically controlled to zero.

Figure 5:
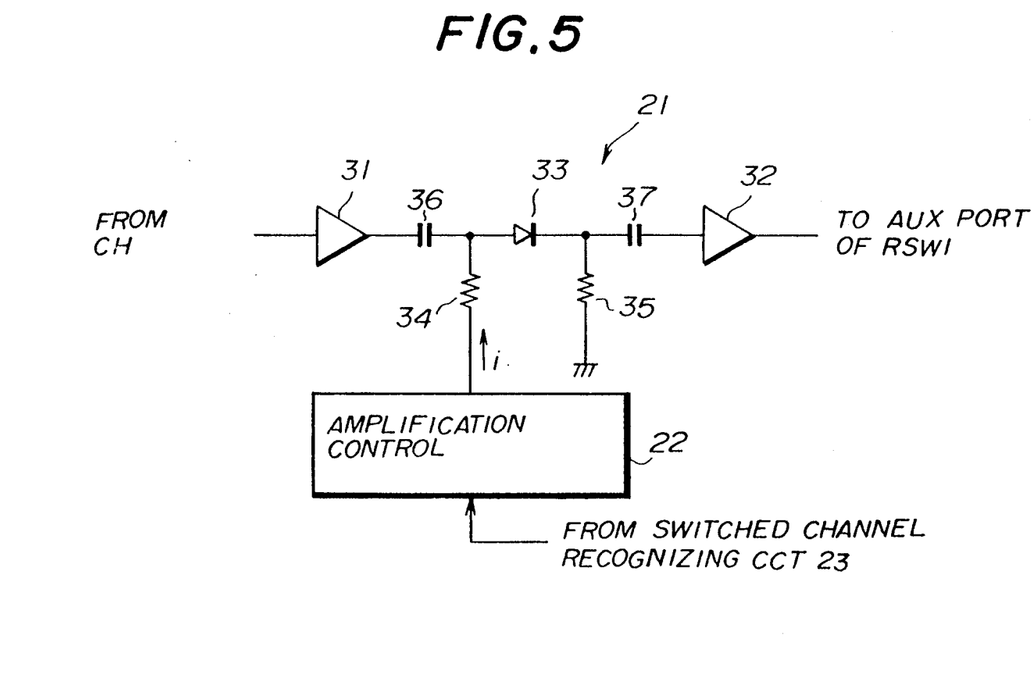
FIG. 5 is a circuit diagram showing an embodiment of a gain control type amplifier of the first embodiment.

FIG. 5 shows an embodiment of the gain control type amplifier circuit 21 shown in FIG. 4, together with the amplification control circuit 22. The gain control type amplifier circuit 21 includes amplifiers 31 and 32 having fixed gains, a pin diode 33, resistors 34 and 35, and capacitors 36 and 37 which are connected as shown. The protection channel CH is connected to an input of the amplifier 31, and an output of the amplifier 32 is connected to the protection port of the bipolar switch RSW1.

In FIG. 5, the baseband signal input IN2, for example, is amplified by fixed gains at the amplifiers 31 and 32. On the other hand, the pin diode 33 receives a current i from the amplification control circuit 22 via the resistor 34, and attenuates the output of the amplifier 31 before inputting the output to the amplifier 32. The current i output from the amplification control circuit 22 is controlled by the instruction from the switched channel recognizing circuit 23 so that the attenuation introduced at the pin diode 33 causes in the gain control type amplifier circuit 21 as a whole an amplification which corresponds to the increase in the loss caused by the switching of the channel from the main channel to the protection channel CH. Therefore, according to the gain control type amplifier circuit 21 shown in FIG. 5, no level difference is introduced in the baseband signal output regardless of the main channel from which the channel is switched to the protection channel CH.

Next, a description will be given of a communication system to which the present invention may be applied, by referring to FIG. 6.

Figure 6:
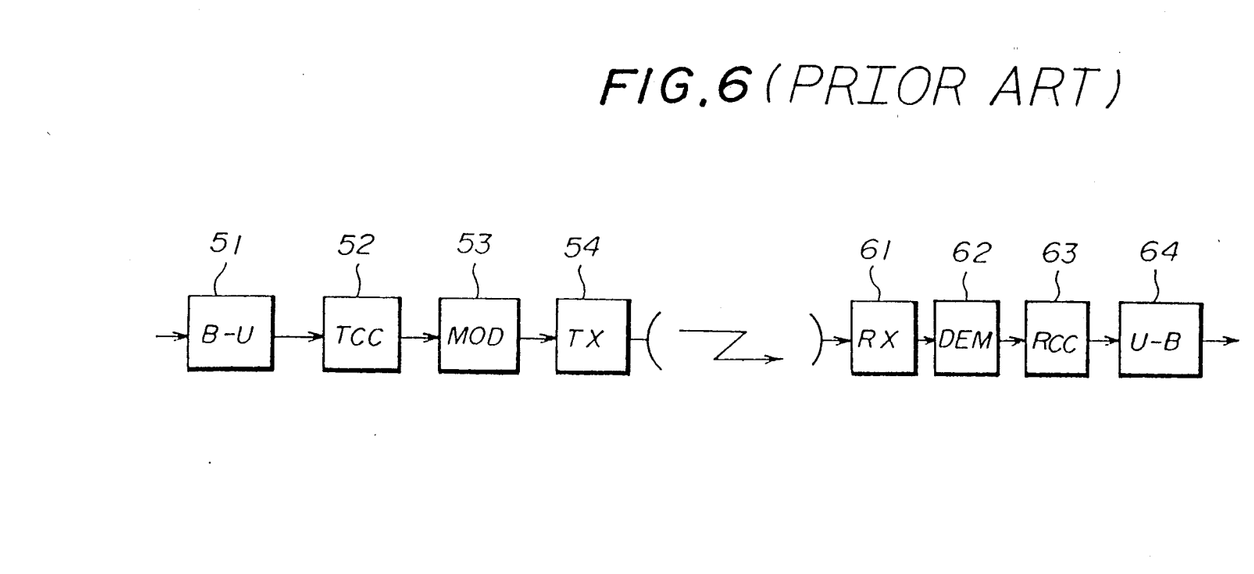
FIG. 6 is a system block diagram showing a communication system to which the present invention may be applied.

In FIG. 6, a transmitting end of the communication system includes a bipolar-unipolar (B-U) converter 51, a transmit code converter (TCC) 52, a modulator 53, and a transmitter 54 which are connected as shown. On the other hand, a receiving end of the communication system includes a receiver 61, a demodulator 62, a receive code converter (RCC) 63, and a unipolar-bipolar (U-B) converter 64 which are connected as shown.

For example, a 140-Mbit main signal is subjected to a bipolar-unipolar conversion in the B-U converter 51, and the TCC 52 inserts overhead bits to the output main signal of the B-U converter 51. The overhead bits may include a switching signal, a digital service channel and the like. The modulator 53 modulates the output signal of the TCC 52 and outputs an IF signal of 70 MHz. The transmitter 54 converts the IF signal into a RF signal of 6 GHz band and transmits the RF signal to the radio interval.

The receiver 61 receives the RF signal via the radio interval and outputs the IF signal by converting the RF signal into the IF signal. The demodulator 62 demodulates the IF signal and outputs a baseband signal. This baseband signal is passed through the RCC 63 which carries out a process complementary to that carried out in the TCC 52, and the output signal of the RCC is subjected to a unipolar-bipolar conversion in the U-B converter 64. As a result, the 140-Mbit main signal is output from the U-B converter 64.

The protection channel switching system according to the present invention may be applied to such a communication system having the transmitting and receiving ends shown in FIG. 6.

Figure 7:
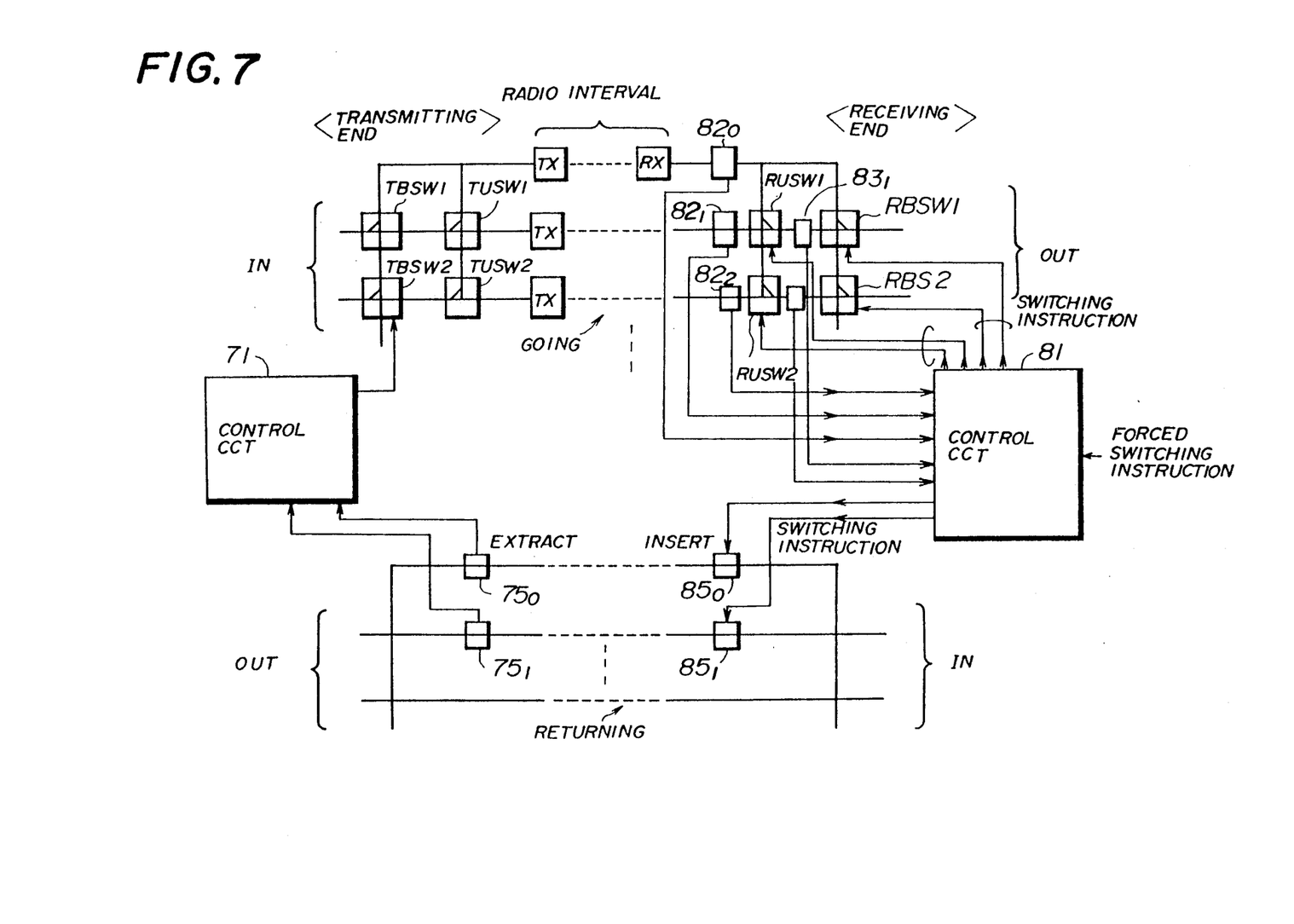
FIG. 7 is a system block diagram showing an essential part of a second embodiment of a protection channel switching system according to the present invention.

Next, a description will be given of a second embodiment of the protection channel switching system according to the present invention, by referring to FIG. 7. FIG. 7 shows an essential part of the second embodiment. In FIG. 7, those parts which are the same as those corresponding parts in FIG. 4 are designated by the same reference numerals, and a description thereof will be omitted.

In FIG. 7, the transmitting end includes a control circuit 71 and unipolar switches TUSW1 through TUSWN in addition to the bipolar switches TBSW1 through TBSWN. On the other hand, the receiving end includes a control circuit 81, line quality detection circuits $82_0$ through $82_N$, unipolar switches RUSW1 through RUSWN, and signal detection circuits $83_1$ through $83_N$ in addition to the bipolar switches RBSW1 through RBSWN. For the sake of convenience, the upper part of FIG. 7 shows the going lines and the lower part of FIG. 7 shows the returning lines. The bipolar switches TBSW1 through TBSWN and RBSW1 through RBSWN respectively correspond to the bipolar switches TSW1 through TSWN and RSW1 through RSWN of the first embodiment.

On the receiving end, the line quality detection circuits $82_0$ through $82_N$ constantly monitor the line quality of each of the channels CH and 1CH through NCH, and inform the control circuit 81 when the line quality deteriorates below a tolerable level. When the line quality of the main channel 2CH deteriorates below the tolerable level, for example, the line quality detection circuit $82_2$ informs the control circuit 81 of this deterioration in the line quality. In this case, the control circuit 81 sends a switching instruction to the transmitting end as shown in the lower part of FIG. 7. That is, the switching instruction is sent to the control circuit 71 of the transmitting end via a TCC $85_2$ and an RCC $75_2$. At the transmitting end, the control circuit 71 controls the switching of the unipolar switches TUSW1 through TUSWN so as to use the protection channel CH in place of the main channel 2CH which has the deteriorated line quality. In addition, the transmitting end informs the receiving end that the switching of the unipolar switches TUSW1 through TUSWN is completed. At the receiving end, the unipolar switches RUSW1 through RUSWN are switched to make a hit-less switching.

Normally, the above described hit-less switching is carried out when one of the main channels 1CH through NCH fails. In addition, since the line quality detection circuit $82_0$ is provided with respect to the protection channel CH, it is possible to use one of the normal main channels in place of the protection channel CH when the protection channel CH fails. Therefore, the protection channel CH may or may not be fixed, and any one of the main channels 1CH through NCH may be used as the protection channel CH in the latter case.

On the other hand, the bipolar switches TBSW1 through TBSWN at the transmitting end and the bipolar switches TBSW1 through RBSWN at the receiving end are switched similarly as in the case of the first embodiment in any of the following three cases.

1) At least one of the unipolar switches TUSW1 through TUSWN and RUSW1 through RUSWN fails.

2) No CMI signal is detected at one of the signal detection circuits $83_1$ through $83_N$.

3) At least one of the bipolar switches TBSW1 through TBSWN and RBSW1 through RBSWN is forcibly switched manually by supplying a forced switching instruction to the control circuit 81.

In each of the cases 1) and 2), the control circuit 81 receives an alarm and controls the switching of the bipolar switches TSW1 through TSWN at the transmitting end and the bipolar switches RBSW1 through RBSWN at the receiving end, similarly to the switching control of the unipolar switches TUSW1 through RUSWN and RUSW1 through RUSWN described above.

Figure 8:
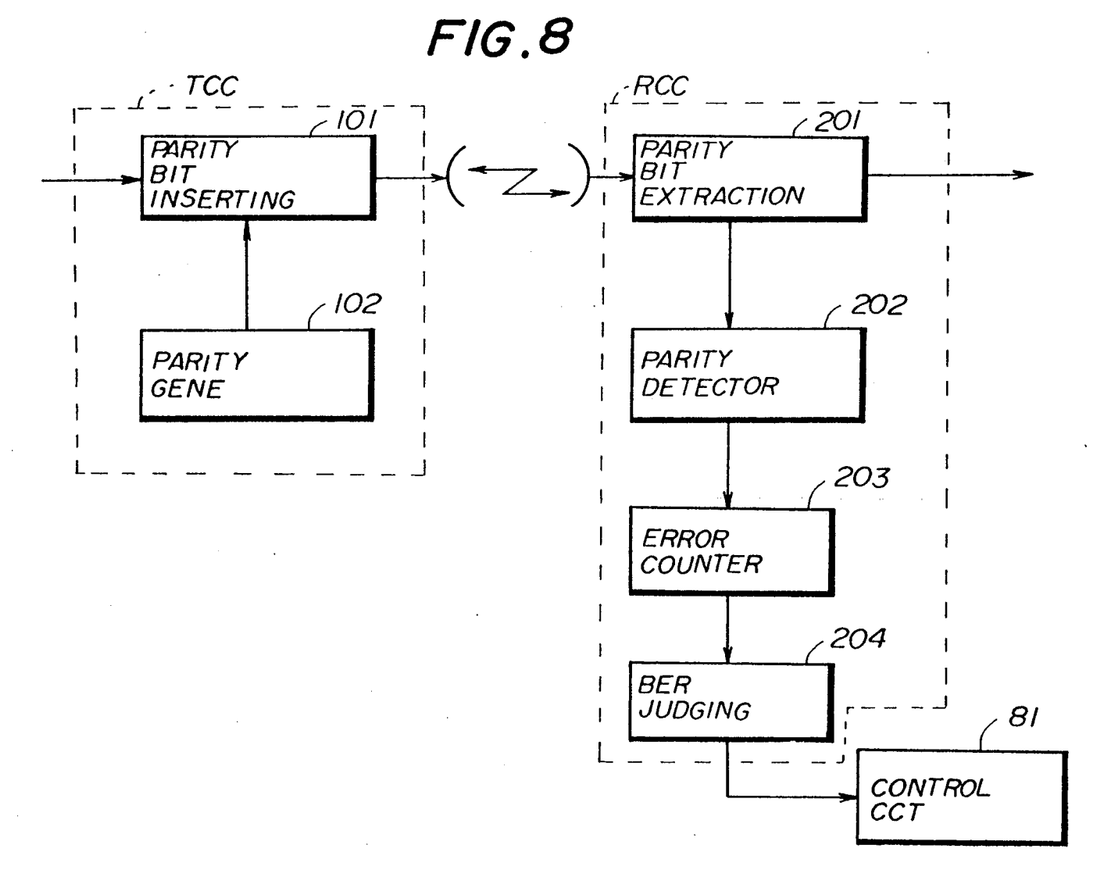
FIG. 8 is a system block diagram showing an embodiment of a line quality detection circuit of the second embodiment.

FIG. 8 shows an embodiment of the line quality detection circuit of the second embodiment. For the sake of convenience, FIG. 8 only shows one TCC at the transmitting end and one RCC at the receiving end.

The TCC includes a parity bit inserting circuit 101 and a parity generator 102 which are connected as shown. The parity bit inserting circuit 101 generates parity bits to be inserted into the baseband signal input, and supplies the generated parity bits to the parity bit inserting circuit 101. The parity bit inserting circuit 101 inserts the parity bits from the parity generator 102 into the baseband signal input for transmission to the receiving end.

The RCC includes a parity bit extraction circuit 201, a parity detector 202, an error counter 203 and a BER judging circuit 204 which are connected as shown. The parity bit extraction circuit 201 extracts the parity bits from the baseband signal input which is received from the transmitting end via the radio interval. The extracted parity bits are supplied to the parity detector 202 which checks the parity of the parity bits so as to detect errors generated during the transmission of the baseband signal input. The number of errors detected by the parity detector 202 is counted by the error counter 203, and a counted value of the error counter 203 is supplied to the BER judging circuit 204. The BER judging circuit 204 judges that the quality of the channel being used has deteriorated below the tolerable level if the counted value of the error counter 203 exceeds a predetermined value. When the predetermined value is exceeded, the BER judging circuit 204 supplies an alarm to the control circuit 81.

In the second embodiment, the control circuit 81 may be considered as corresponding to the switching control circuit 24 of the first embodiment or, alternatively, the switching control circuit 24 may be considered as a part of a control circuit which corresponds to the control circuit 81.

Further, the present invention is not limited to these embodiments, but various variations and modifications may be made without departing from the scope of the present invention.

What is claimed is:

1. A method of switching a channel which is used for communication between a transmitting end and a receiving end from a main channel to a protection channel, said transmitting end including N first bipolar switches respectively having an input port for receiving a baseband signal input, a main port for outputting the baseband signal input to a corresponding one of N main channels and a protection port for outputting the baseband signal input to the protection channel, said protection ports of the N first bipolar switches being connected in series to the protection channel, said input port of the first bipolar switch being normally connected to the main port and connected to the protection port when switching to the protection channel, said receiving end including N second bipolar switches respectively having a main port for receiving the baseband signal input received from the transmitting end via a corresponding one of the N main channels, a protection port for receiving the baseband signal input received from the transmitting end via the protection channel and an output port for outputting the received baseband signal input as a baseband signal output, said protection ports of the N second bipolar switchers being connected in series to the protection channel, wherein a loss of the received baseband signal input when the protection channel is used is dependent on an arbitrary number of second bipolar switches through which the received baseband signal input passes before the baseband signal output is obtained, said output port of the second bipolar switch being normally connected to the main port and connected to the protection port when switching to the protection channel, said method comprising the steps of:

(a) recognizing at the receiving end the main channel from which the channel is switched to the protection channel;
 (b) generating at the receiving end control information related to an amplification of the baseband signal input received via the protection channel based on the main channel recognized in said step (a); and
 (c) amplifying at the receiving end the baseband signal input received via the protection channel by the amplification determined by the control information generated by said step (b).

2. The method as claimed in claim 1, wherein said step (a) comprises the substeps of:

(a1) detecting at the receiving end a deterioration of the main channel being used when signal quality falls below a tolerable level;
 (a2) notifying the transmitting end and the receiving end of the deterioration detected in the substep (a1);
 (a3) notifying the transmitting end and the receiving end of the main channel from which the channel is switched to the protection channel; and
 (a4) recognizing at the receiving end the main channel from which the channel is switched to the protection channel based on said notification.

3. The method as claimed in claim 1, wherein said step (b) generates the control information based on the number of second bipolar switches through which the received baseband signal input passes before the baseband signal output is obtained.

4. The method as claimed in claim 1, wherein said step (c) amplifies the baseband signal input received via the protection channel by the amplification determined by the control information generated by said step (b) so as to automatically compensate for the loss caused by the passing of the received baseband signal input which is received via the protection channel through the arbitrary number of second bipolar switches.

5. The method as claimed in claim 1, wherein a fixed one of N+1 channels is used as the protection channel and remaining N channels are used as the main channels.

6. The method as claimed in claim 1, wherein an arbitrary one of N+1 channels is used as the protection channel and N channels other than that used as the protection channel are used as the main channels.

7. A system for switching a channel which is used for communication between a transmitting end and a receiving end from a main channel to a protection channel, said transmitting end including N first bipolar switches respectively having an input port for receiving a baseband signal input, a main port for outputting the baseband signal input to a corresponding one of N main channels and a protection port for outputting the baseband signal input to the protection channel, said protection ports of the N first bipolar switches being connected in series to the protection channel, said input port of the first bipolar switch being normally connected to the main port and connected to the protection port when switching to the protection channel, said receiving end including N second bipolar switches respectively having a main port for receiving the baseband signal input received from the transmitting end via a corresponding one of the N main channels, a protection port for receiving the baseband signal input received from the transmitting end via the protection channel and an output port for outputting the received baseband signal input as a baseband signal output, said protection ports of the N second bipolar switches being connected in series to the protection channel, wherein a loss of the received baseband signal input w n the protection channel is used is dependent on an arbitrary number of second bipolar switches through which the received baseband signal input passes before the baseband signal output is obtained, said output port of the second bipolar switch being normally connected to the main port and connected to the protection port when switching to the protection channel, said system comprising:

switched channel recognizing means for recognizing at the receiving end the main channel from which the channel is switched to the protection channel;
 amplification control means for generating at the receiving end control information related to an amplification of the baseband signal input received via the protection channel based on the main channel recognized in said switched channel recognizing means; and amplifying means for amplifying at the receiving end the baseband signal input received via the protection channel by the amplification determined by the control information generated by said amplification control means.

8. The system as claimed in claim 7, wherein said switched channel recognizing means comprises:

first means for detecting at the receiving end a deterioration of the main channel being used when signal quality falls below a tolerable level;

second means for notifying the transmitting end and the receiving end of the deterioration detected by said first means; and third means for recognizing at the receiving end the main channel from which the channel is switched to the protection channel based on said notification.

9. The system as claimed in claim 7, wherein said amplification control means generates the control information based on the number of second bipolar switches through which the received baseband signal input passes before the baseband signal output is obtained.

10. The system as claimed in claim 7, wherein said amplifying means amplifies the baseband signal input received via the protection channel by the amplification determined by the control information generated by said amplification control means so as to automatically compensate for the loss caused by the passing of the received baseband signal input which is received via the protection channel through the arbitrary number of second bipolar switches.

11. The system as claimed in claim 7, wherein a fixed one of N+1 channels is used as the protection channel and remaining N channels are used as the main channels.

12. The system as claimed in claim 7, wherein an arbitrary one of N+1 channels is used as the protection channel and N channels other than that used as the protection channel are used as the main channels.

13. The system as claimed in claim 7, which further comprises a hybrid circuit means for supplying switching instructions to the second bipolar switches and to said switched channel recognizing means, and said switched channel recognizing means recognizes the main channel from which the channel is switched to the protection channel based on the switching instructions received from said hybrid circuit means.

* * * * *

UNITED STATES PATENT AND TRADEMARK OFFICE
CERTIFICATE OF CORRECTION

PATENT NO. : 5,311,170
DATED : May 10, 1994
INVENTOR(S) : Wachi, et al.

It is certified that error appears in the above-indentified patent and that said Letters Patent is hereby corrected as shown below:

In column 9, line 37, delete "switchers" and insert --switches--.

In column 10, line 53, delete "w n" and insert --when--.

Signed and Sealed this

Thirty-first Day of January, 1995

Attest:

BRUCE LEHMAN

*Attesting Officer*     Commissioner of Patents and Trademarks